3,448,169
STABILIZATION OF ACYLATED OR ALKYLATED POLYOXYMETHYLENES
Kuno Wagner, Leverkusen, Hans Scheurlen, Burscheid, and Helmuth Kritzler, Cologne-Flittard, Germany, assignors to Farbenfabriken Bayer Aktiengesellschaft, Leverkusen, Germany, a corporation of Germany
No Drawing. Application June 2, 1966, Ser. No. 554,667, which is a division of application Ser. No. 31,259, May 24, 1960, now Patent No. 3,296,194, dated Jan. 3, 1967. Divided and this application July 12, 1967, Ser. No. 661,489
Claims priority, application Germany, June 4, 1959, F 28,611
Int. Cl. C08g 37/02, 41/04, 51/60
U.S. Cl. 260—858                                    1 Claim

ABSTRACT OF THE DISCLOSURE

Thermal stability obtained by the addition of groups of compounds including amines and hydrazines, salts of inorganic or organic bases and dithiocarbamic acids, aromatic and cycloaliphatic diamines alkylated in the ortho positions to the amino group, aldehydes of tertiary aromatic amines and their functional derivatives, 1,6-tetra-substituted hydrazodicarbonamides, esters of hydrazodicarboxylic acid, 1-substituted hydrazine mono-carboxylic acid esters, 1-substituted semi-carbazide and thio-semi-carbazide mono-carboxylic acid esters, 1,4-substituted semi-carbazides and thio-semi-carbazides, mono-substituted urethanes and thiourethanes, allophanic acid esters, biuret derivatives, N-substituted melamines containing NH groups, substituted guanidines, formamidines, and amidines as well as iminoethers.

CROSS REFERENCE TO RELATED APPLICATIONS

This application is a division of application Ser. No. 554,667 as filed June 2, 1966, now Patent No. 3,376,255, said latter application being a division of application Ser. No. 31,259 as filed May 24, 1960, and now issued as U.S. Patent No. 3,296,194 of Jan. 3, 1967.

The present invention relates to normally solid film-forming acylated and/or alkylated polyoxymethylenes of high molecular weight which are stabilized by means of organic nitrogen compounds.

ω,ω'-dihydroxy-polyoxymethylenes of high molecular weight only show a slight thermal stability in their thermoplastic range between 170 and 200° C. A degradation of the high-molecular chain molecules takes place to give substantially lower molecular weights with formaldehyde being split off mainly from the ends of the chains; a result is the loss of the valuable physical properties and the intrinsic viscosities fall substantially to values <0.4 (measured in dimethyl formamide at 150° C.).

It is already known to add hydrazines, hydrazides, phenols, aromatic amines, urea and thiourea derivatives to the ω,ω'-dihydroxypolyoxymethylenes for improving the thermal stability (see U.S. patent specification No. 2,810,708, Belgain Patent 558,777 and British patent specification No. 748,856). It is true that the thermostability of the ω,ω'-dihydroxy-polyoxymethylenes is improved in this way, but the degradation and the quantity of formaldehyde librated when processing at temperatures above 180° C. is still so considerable that so far it has not been possible to effect a processing to high-grade plastics.

Further improvement in the thermostability of the ω,ω'-dihydroxy-polyoxymethylenes can be obtained by the terminal hydroxyl groups of the polyoxymethylenes being acylated or alkylated. In this way, the amount of formaldehyde split off from the ends of the chains at temperatures above 180° C. is substantially reduced. The amount of formaldehyde split off by thermal cracking of the molecule, which is increased by traces of acids and impurities, and the degradation recorded in this case, is however always still sufficient to substantially impair the shaping and the physical properties of the polyoxymethylenes of high molecular weight. Thus, polyoxymethylene diacetates and diethers often shown at 220° C. and within the first 5 minutes, decomposition speeds which result in 0.3 to 0.4% of formaldehyde being split off per minute. At lower temperatures, for example at 190° C., the products certainly split off a smaller quantity of formaldehyde, but the moulded elements manufactured at this temperature are however permeated by gas bubbles. Furthermore, on being melted, particularly in the presence of air, the molecule is degraded to about ⅓ of the original molecular weight. As a consequence, the mechanical property values, such as impact bending strength and toughness, are appreciably lowered.

In French Specification 1,131,939 there are disclosed polyoxymethylenes which have added thereto antioxidants such as phenyl-β-naphthylamine or 2,6-di-tertiary-butyl-p-cresol. These additives have the drawback that they either give rise to a strong discoloration of the compositions or that they do not stabilize compositions to a degree which is required by the practice. In French Specification 1,179,857 there are disclosed acylated or alkylated polyoxymethylenes of high molecular weight which are stabilized by addition of polyamides.

It has now been found that the thermal stability of normally solid film-forming acylated or alkylated polyoxymethylenes can be essentially improved by adding to said polyoxymethylenes at least one organic nitrogen compound out of the following groups of compounds:

(1) Amines and hydrazines of the general formulae:

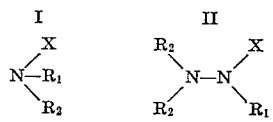

in which X represents a radical comprising an ester group, ether and thioether group, carbonamide group, urethane group, acetal group or nitrile group, bonded to the nitrogen atom by way of an aliphatic radical, or an organic radical, preferably a hydrocarbon radical bonded to the nitrogen atom by way of a Si atom; and $R_1$, $R_2$ and $R_3$ each represent aliphatic, cycloaliphatic or araliphatic radicals or like or different substituents X, it being possible for two of the substituents $R_1$, $R_2$, $R_3$ also to jointly represent chain members of a ring system which can contain further hetero atoms and/or double bonds.

(2) Amines and hydrazines of the general formulae:

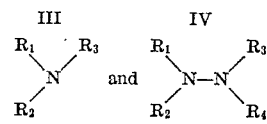

wherein $R_1$, $R_2$, $R_3$ and $R_4$ represent aliphatic, cycloaliphatic and araliphatic radicals, and in case of Formula III two of the substituents $R_1$, $R_2$, $R_3$ can jointly be chain members of a ring system which if necesary can contain further hetero atoms, and the sum of the carbon atoms of all substituents $R_1$, $R_2$, $R_3$ and $R_4$ is greater than 12, preferably 12 to 40.

(3) Salts of inorganic or organic bases and dithiocarbamic acids.

(4) Aromatic and cycloaliphatic primary, secondary and tertiary diamines, which are alkylated in the ortho positions to the amino group.

(5) The fifth group of the stabilizers according to the invention comprises the following classes of compounds: 1,6-tetra-substituted hydrazodicarbonamides, hydrazodicarboxylic acid esters with monohydric aliphatic, cycloaliphatic or araliphatic alcohols, which esters contain up to 40 carbon atoms, 1-substituted hydrazine mono-carboxylic acid esters, 1-substituted semi-carbazide and thio-semicarbazide mono-carboxylic acid esters, 1,4-substituted semi-carbazides and thio-semi-carbazides, monosubstituted urethanes and thio-urethanes, allophanic acid esters, biuret derivatives, N-substituted melamines containing NH groups, substituted guanidines, formamidines, and amidines as well as iminoethers, the preferred substituents thereon being alkyl, cycloalkyl, aryl and aralkyl groups having together up to 40 carbon atoms.

(6) Aldehydes of tertiary aromatic amines or their functional derivatives, such as for example acetals, azines, hydrazones, oximes, semi-carbazones, Schiff's bases and others.

Examples of suitable stabilizing agents of the recited group 1 of compounds are the following:

(1a) Esters of silicic, phosphoric, carbonic acid or of saturated or unsaturated aliphatic, cycloaliphatic, araliphatic or aromatic carboxylic acids (having up to 25 carbon atoms) with tertiary amines or hydrazines which are substituted at at least one nitrogen atom by at least one hydroxalkyl group, the other substituents being alkyl, cycloalkyl or aralkyl radicals (the sum of the carbon atoms in said amines or hydrazines being up to 54).

These compounds may be represented by way of example by the following formulae:

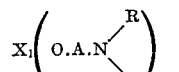

in which $X_1$ stands for $Si\equiv$, $O-P\equiv$ or $O-C-$, A is a bivalent aliphatic radical having 2 to 3 carbon atoms

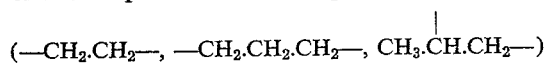

$n$ is a whole integer from 2 to 4 corresponding to the valence of X, R is a like or different monovalent hydrocarbon radical (alkyl having 1 to 20 carbon atoms, cycloalkyl such as cyclohexyl, aralkyl such as benzyl).

in which $X_2$ stands for the radical:

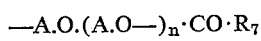

(A having the same meaning as above, $n$ standing for a whole integer from 0 to 3 and $R_7$ for alkyl having 1 to 20 carbon atoms: cycloalkyl such as cyclohexyl, aralkyl such as benzyl and aryl such as phenyl, tolyl) $R_5$ and $R_6$ are alkyl, cycloalkyl, aralkyl (as nearer defined above) or $X_2$ and $R_5$ and $R_6$ together may stand for members necessary to close a heterocyclic ring such as a morpholine, thio-morpholine ring.

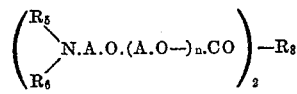

in which $R_5$ and $R_6$ have the same meaning as above with the variation that they cannot stand for $X_2 \cdot A$ and $n$ have the same meaning as above and $R_8$ stands for a bivalent hydrocarbon radical (saturated or unsaturated alkylene having 1 to 12 carbon atoms, phenylene, cyclohexylene).

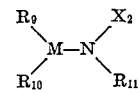

in which $X_2$ has the same meaning as above and $R_9$, $R_{10}$ and $R_{11}$ are monovalent hydrocarbon radicals as indicated above or $X_2$.

Among the compounds corresponding to the last three formulae those are preferred which contain more than 12, preferably 20 to 36 carbon atoms.

(1b) Ethers and polyethers of saturated or unsaturated aliphatic, cycloaliphatic, araliphatic or aromatic hydroxy compounds including polyglycols (having up to 30 carbon atoms) with tertiary amines or hydrazines which are substituted by at least one hydroxyalkyl group (having preferably 2 to 3 carbon atoms) the other substituents being alkyl, cycloalkyl or aralkyl radicals (all substituents having up to 54 carbon atoms).

(1c) Compounds of the Formulae I and II in which X stands for one of the radicals:

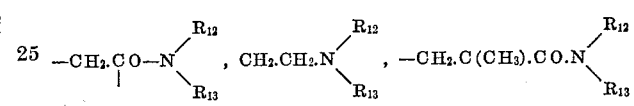

wherein $R_{12}$ and $R_{13}$ stand for hydrogen, aliphatic, cycloaliphatic or araliphatic radicals having up to 26 carbon atoms.

(1d) The reaction products of isocyanates with hydroxy-alkylated tertiary amines and hydrazines corresponding to Formulae I and II in which X stands for the radical $-A \cdot O \cdot CO \cdot NH \cdot R_{14}$ wherein A has the same meaning as above and $R_{14}$ stands for a monovalent hydrocarbon radical (alkyl having 2 to 18 carbon atoms, aryl such as phenyl, tolyl, naphthyl, aralkyl such as benzyl, cycloalkyl such as cyclohexyl), furthermore the reaction products of 1 mole of an aliphatic, cycloaliphatic or araliphatic diisocyanate (having 6 to 16 carbon atoms) with 2 moles of a monohydroxyalkylated tertiary amine or hydrazine as defined above.

(1e) Acetals of the above defined hydroalkylated tertiary amines and hydrazines with aliphatic aldehydes having 1 to 7 carbon atoms corresponding to the formulae I and II wherein X stands for the radical $-A.O.B.O.R.$ wherein A has the same meaning as above, B stands for a bivalent aliphatic radical having 1 to 7 carbon atoms and R stands for alkyl (having 1 to 20 carbon atoms), aralkyl cycloalkyl.

(1f) Compounds of the formulae I and II wherein X stands for the radicals $-CH_2.CH_2CN$ and

1g) Compounds of the formulae I and II wherein X stands for the radical

R standing for alkyl having preferably 1 to 2 carbon atoms or in which X stands for

the two free valencies of the radical being saturated by the radicals

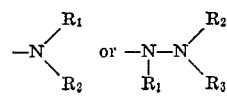

resulting by subtraction of X from the compounds of Formulae I and II. Those compounds are preferred which contain only one silicon atom.

Specific examples of stabilizers in the group according to the invention are N,N - dibutyl trimethylsilylamine, N - methyl - N - octadecyl - trimethylsilylamine, N,N,N',N' - tetra - n - butyl - dimethylsilyldiamine, dimethylsilyl - bis - N,N' - stearyl - methyl - amine, while among the series of ester amines, there are mentioned esters of silicic, phosphoric, carbonic and carboxylic acids, such as for example esters of acetic acid, propionic acid, benzoic acid, malonic acid, succinic acid, phthalic acids with hydroxyethylated or hydroxypropylated tertiary aliphatic, cycloaliphatic, araliphatic or heterocyclic amines, or the corresponding hydrazines, such as for example the esters of triethanolamine, N-methyl-diethanolamine, N,N-di-n-butyl-ethanolamine and N,N-stearyl-methyl ethanolamine (N-methyl-N-stearyl ethanolamine acetate or propionate, or the corresponding n-propanol- or isopropanol amine derivatives, N-lauryl-N-butyl ethanol (propanol) amine acetate or propionate, N-cyclohexyl-diethanolamine diacetate or propionate, N-hydroxymethyl-morpholine acetate or propionate, N-hydroxyethyl-piperidine acetate or propionate, N,N'-dibenzyl-N,N'-β-acetoxyethyl hydrazine, N,N'-dicyclohexyl-N,N'-di-β-acetoxyethyl-hydrazine). Moreover reaction products from the said acids with hydroxyalkyl amines containing ether groups in the alkyl chain which can for example be obtained by the action of ethylene oxide or propylene oxide on primary and secondary aliphatic, cycloaliphatic and araliphatic amines. Other ether amines of this group are the reaction product of phenol, guiacol or resorcinol with N,N-diethylaminoethyl chloride; also to be mentioned are the reaction products of monoisocyanates and polyisocyanates (hexyl-, cyclohexyl-, phenyl-, benzyl isocyanate, tetra-, hexamethylene-, 1,4-cyclohexyl diisocyanate, 4,4'-dicyclohexyl methane diisocyanate) with aminoalcohols such as for example N-methyl-diethanolamine or N,N-dibutylethanolamine or the corresponding propanolamine derivatives, whereby the polyisocyanates are reacted with mono-alkanolamines, the proportions being such that the reaction products do not contain free hydroxy or isocyanate groups.

Examples of compounds of the second group are N,N-diethyl stearylamine, N,N-dibutylstearylamine, N,N'-dibenzyl-N,N'-diethyl hydrazine, N-stearylmorpholine, N-lauryl-piperidine, N,N-dipropylstearylamine.

Examples of stabilizers of the third group for use according to the invention are salts of N,N-dibutyl-, N-methyl - N - stearyl-, N - methyl - N - lauryl-, N - butyl-N-stearyl-, N-isopropyl-N-butyl-, N-cyclohexyl-N-butyl-, N-cyclohexyl-N-benzyl-dithiocarbamic acids with metals (such as sodium, potasium, lithium, calcium, strontium, barium, magnesium, zinc, iron, cobalt, nickel) ammonia or amines, such as for example with dibutyl amine or methyl stearylamine.

Examples of the stabilizers of the fourth group are 2,3,5,6-tetraethyl-p-phenylene - diamine, 2,3,5,6-tetra-isopropyl-p-phenylene diamine, 2,3,5,6-tetra-tertiary butyl-p-phenylene diamine, 3,3',5,5'-tetraisopropyl-4,4'-diaminodiphenyl methane and the corresponding perhydrogenated, peralkylated derivatives.

Examples of the stabilizers of the fifth group are N,N,N''',N'''' - tetra - n - propyl - hydrazodicarbonamide, N,N,N''',N'''' - tetra - n - butyl - hydrazodicarbonamide, hydrazodicarboxylic acid dipropyl ester, hydrazodicarboxylic acid dibutyl ester, N,N-dimethylhydrazine carboxylic acid lauryl ester, reaction products of hexamethylene diisocyanate or hexamethylene diisocyanate with mono- and polyglycols or mercaptans, 1-phenyl-4-dibutyl-semicarbazide, 1,4-diphenyl thiosemicarbazide, trimethylol-melamine, tri-n-butyl ether N-phenyl-N',N',N'',N''-tetramethyl guanidine, N,N',N''-triphenyl guanidine, N-phenyl-N',N'-dimethylformamidine, N,N'-diphenyl benzamidine and benziminoethyl ether.

Examples of the stabilizers of the sixth group are 4-diethylaminobenzaldehyde 4-dimethylaminobenzaldehyde azine (reaction product of 2 mols of aldehyde with 1 mol of hydrazine), 4 - diethylaminobenzaldehyde - phenyl hydrazone, 4 - diethyl - aminobenzaldehyde - phenyl hydrazone and 4-diethyl-aminobenzaldehyde-phenyl semicarbazone.

The aforesaid compounds are suitable for stabilizing normally solid, film-forming polyoxymethylenes of high molecular weight having terminal acyl or ether groups, such as acetyl, propionyl, stearyl, benzoyl, acyl groups derived from cyclohexyl- and phenyl acetic acid (that is to say that acyl groups derived from aliphatic, cycloaliphatic, araliphatic and aromatic carboxylic acids), and alkyl ether groups having preferably 1 to 4 carbon atoms. For producing these products the normally solid polyoxymethylenes may be acylated by means of acetic acid, propionic acid, benzoic acid or other carboxylic acids and/or may be alkylated with the aid of ortho-esters, such as for example orthoformic acid esters. Such acylated and/or alkylated polyoxymethylenes of high molecular weight are for example described in Belgian patent specification 583,933, and in the U.S. patent specification 3,170,896 and 3,046,251, U.S. patent application Ser. No. 21,855, filed Apr. 13, 1968, now U.S. Patent No. 3,193,531.

The stabilizers according to the invention are added to the polyoxymethylenes stabilized at the terminal groups in the quantities of about 0.01 to 4 percent by weight, advantageously 0.5 to 3 percent by weight, prior to the processing and shaping, it being possible for the stabilizers to be used singly or in any desired mixture. It is moreover possible to use them in combinations with known antioxidants, such as for example phenols, sulfur-containing compounds such as mercaptobenzthiazole, and also with fillers, such as carbon black, plasticizers, lubricants, inorganic and organic pigments and other additives.

The stabilizers or mixtures of these stabilizers can be added in substance to the recited acylated or alkylated polyoxymethylenes by milling or kneading, but they are advantageously dissolved in a solvent and sprayed on to the products or intimately mixed with excess solvents together with the polyoxymethylenes stabilized at the terminal groups, the solvent thereafter being evaporated.

The stabilizers according to the invention permit more especially a processing of the high molecular weight polyoxymethylenes stabilized at the terminal groups in accordance with the injection moulding process, without the molecular weights of the said polyoxymethylenes falling into ranges which are characterized by brittleness and low strength values.

The stabilizing action of the stabilizers according to the invention is to be shown by reference to the following comparison: Whereas a polyoxymethylene diacetate with an intrinsic viscosity of 0.85 (measured at a 0.5 percent solution in dimethyl formamide at 150° C.) on being melted while in contact with air at 200° C. during a heating period of 2 minutes, changes into a thinly liquid melt which, after cooling, yields a brittle film which breaks easily, the said film consisting of polyoxymethylenes which only still have an intrinsic viscosity of 0.2, the same sample with the same intrinsic viscosity, to which for example 0.5 percent of triethanolamine triacetate, N,N-dibutyl ethanolamine acetate or N-methyl-diethanolamine diacetate are added, produces an intrinsic viscosity of 0.59 to 0.65 when treated in the same manner; the films thereby obtained are tough, pliable and elastic. If the same experiment is carried through while using the same amount of a high molecular weight polyamide (produced from ε-caprolactame), the viscosity value drops to 0.42.

By the addition of the stabilizers according to the invention, the molecular weight ranges with the valuable physical properties (corresponding to intrinsic viscosities of 0.55 to 3.0 as measured at 0.5 percent solutions in dimethylformamide at 150° C.) are substantially maintained at the high processing temperatures.

In the following examples, the parts indicated are parts by weight.

Example 1

Each batch compromising 10 parts of high-molecular acetylated polyoxymethylene having an intrinsic viscosity of 0.85 (measured at 150° C. at a 0.5 percent solution in dimethyl formamide), is suspended in 60 to 100 parts by volume of acetone and the mixture has added thereto 0.4 percent of beeswax and one of the following stabilizers in quantities of 2 percent (—0.2 part): triethanolamine triacetate, N-methyl-diethanolamine diacetate or dipropionate, N,N-dibutyl-$\beta$-ethanolamine acetate or propionate, N-methyl-N-stearylamino-propionitrile, silicic acid-tetra-($\beta$-N-dibutylaminoethyl)-ester, dimethylsilyl-bis-(N-butylamine), phosphoric acid-tris-($\beta$-N-dibutylaminoethyl)-ester, N,N-dibutyl-N-N'-di-$\beta$-acetoxyethylhydrazine, N-methyl-N-stearyl-methylstearyl ammonium dithiocarbamate, dimethylstearylamine, trimethyl stearylammonium acetate, 2,3,5,6-tetraethyl-p-phenylene diamine, 1,6-tetra-n-propyl-hydrazodicarbonamide, 1,4-diphenyl thiosemicarbazide, N,N-dimethylhydrazine carboxylic acid lauryl ester, p-dimethylaminobenzaldehyde phenyl hydrazone, $\beta$-diethylaminoethyl phenyl ether or 3,3',5,5'-tetraisopropyl-4,4'-diamino-diphenylmethane.

While stirring, the acetone is slowly evaporated, the polyoxymethylene mixture is shaken for 10 minutes, thereafter dried and once again thoroughly mixed. Two parts of the unstabilized specimen and each of the stabilized specimen are melted in air at 200 ±1° in a thin layer and quickly cooled after 2 minutes. Whereas the melt of the unstabilized specimen splits off formaldehyde to an appreciable degree and the melt viscosity rapidly falls, the stabilized specimens show only a slight or no formaldehyde vapour pressure and remain viscous; in contrast to the unstabilized comparison specimen, they are tough and elastic after cooling. The following table shows the extreme drop in the intrinsic viscosity of the unstabilized specimen, in comparison with a number of stabilized specimens.

| Specimens | $\eta i$ Before melting | $\eta i$ After melting | Properties |
|---|---|---|---|
| Unstabilized polyoxymethylene diacetate. | 0.85 | 0.21 | Brittle, no strength. |
| +Triethanolamine triacetate. | 0.85 | 0.61 | Elastic, tough. |
| +N-methyl-diethanolamine diacetate. | 0.85 | 0.58 | Do. |
| +N-methyl-N-stearyl-methylstearyl ammonium dithiocarbamate. | 0.85 | 0.57 | Do. |
| 3,3',5,5'-tetraiso-propyl-4,4'-diamino-diphenyl-methane. | 0.85 | 0.64 | Do. |

$\eta$ i.—(Inherent viscosity) measured at a 0.5 percent solution in dimethyl ormamide at 150° C.

The polyoxymethylene referred to above is produced as follows:

For the production of monomeric formaldehyde, paraformaldehyde is subjected to thermal decomposition. The monomeric formaldehyde is mixed in the pyrolysis vessel with pure dry nitrogen and thereafter conducted through an extensive cooling system at a temperature of —20° C. In a second cooling system at a temperature of —85° C., the formaldehyde is liquified and supplied to the polymerization vessel. The polymerization vessel is provided with an inlet pipe for formaldehyde, a mechanical stirrer and a gas-outlet pipe. Disposed in the polymerization vessel are 1000 parts by volume of anhydrous toluene, to which are added 0.035 parts by weight of tetramethyl urea, dissolved in 3 parts by volume of anhydrous toluene. The formaldehyde is added dropwise over a period of 2½ hours and while stirring into the reaction medium cooled to —20° C., whereby polymerization takes place. After stirring for another hour at —20° C., the polymerization product is suction filtered. There is obtained a pure white high molecular weight polyoxymethylene, which is extracted by stirring twice with methanol and twice with acetone. The product is thereafter dried in vacuo for 4 hours at 60° C. The yield is 118 g.

The polyoxymethylene thus obtained is acetylated according to the following prescription:

20 parts of the recited polyoxymethylene are treated with 400 parts of acetic anhydride, 20 parts of phenyl isocyanate (or 10 parts of tolyl-2,4-diisocyanate) and 0.7 part of sodium acetate in a nitrogen atmosphere for 15 hours at 139 to 140° C. The acetylated polyoxymethylene is filtered off from the cooled reaction solution, freed from acetic anhydride by washing several times with acetone and methanol, freed from traces of sodium acetate by washing with water, and dried after a further treatment with acetone.

Example 2

In a manner analogous to Example 1, 2 percent of triethanolamine triacetate are admixed with an intrinsic viscosity of 1.2 (measured at a 0.5 percent solution in dimethyl formamide at 150° C.) and the thermostability of the specimen is determined at 222° C. under a nitrogen atmosphere. Whereas the unstabilized specimen has already lost 5 percent of formaldehyde after 20 minutes and 16 percent thereof after 120 minutes, the stabilized specimen only loses 1 percent of formaldehyde in 20 minutes and only 5 percent after 120 minutes.

Example 3

An acetylated polyoxymethylene of high molecular weight, having an intrinsic viscosity of 0.95 (measured at a 0.5 percent solution in dimethyl formamide at 150° C.), is mixed in accordance with Example 1 with 1.2 percent of N,N-dibutyl-ammonium dithiocarbamate and 0.5 percent of beeswax and the thermostability of the specimen is determined at 222° C. Whereas the unstabilized specimen has already split off 5.4 percent of formaldehyde after 20 minutes and 14.5 percent after 120 minutes, the stabilized specimen loses only 3 percent of formaldehyde in 20 minutes and only 4.6 percent after 120 minutes.

The polyoxymethylene may be prepared by polymerizing substantially anhydrous formaldehyde in an inert solvent while using aluminium oxide as catalyst (compare French specification 1,226,239). The acetylation may be carried through according to the prescription of Example 1 with the variation that diisopropyl carbondiimide is used as catalyst.

Example 4

A high molecular polyoxymethylene diacetate may be prepared according to the data of Example 3 and has an intrinsic viscosity of 0.75 at 150° C. at a 0.5 percent solution in dimethyl formamide, is mixed according to Example 1 with 1.5 percent of 1,6-tetrapropyl hydrazodicarbonamide and 0.5 percent of beeswax and the thermostability of the specimen is determined at 222° C. under a nitrogen atmosphere. Whereas the unstabilized specimen has already lost 12 percent of formaldehyde after 20 minutes and 18 percent after 120 minutes, the stabilized specimen loses 6 percent of formaldehyde in 20 minutes and 10 percent after 120 minutes.

Example 5

An ethylated high-molecular polyoxymethylene as obtained according to Example 1 of Belgian specification 583,593 is mixed according to Example 1 with 1.5 percent of N-methyl-N-stearyl-methylstearyl-ammonium dithiocarbamate and the thermostability is determined at 222° C. under nitrogen. Whereas the unstabilized specimen has already lost 37 percent of formaldehyde after 20 minutes and 79 percent thereof after 120 minutes, the stabilized specimen loses only 9 percent of formaldehyde in 20 minutes and 26.6 percent after 120 minutes.

Example 6

An acetylated polyoxymethylene is used which has an intrinsic viscosity of 1.0 (measured at 0.5 percent solution in butyrolactone at 150° C.). 100 parts of the polyoxymethylene diacetate are suspended in a solution of 0.8 part of bis-thiourethane obtained from 1 mol of hexamethylene diisocyanate and 2 mols of dodecyl mercaptan and 0.3 part of beeswax in acetone. Thereafter, the acetone is completely evaporated in vacuo and the specimen is finally dried at 60° C. in vacuo. The thermostability is determined at 222° C. under nitrogen. Whereas an unstabilized comparison substance has already split off 8 percent of formaldehyde after 20 minutes and 20 percent after 120 minutes, the loss of formaldehyde with the stabilized specimen after 20 minutes is only 4 percent and after 120 minutes it is only 7 percent.

Example 7

The procedure indicated in Example 6 is followed and a polyoxymethylene diacetate is used which has an intrinsic viscosity of 1.8 (measured at a 0.5 percent solution in butyrolactone at 150° C.). The additives admixed in acetone solution with the polyoxymethylene diacetate amount to 0.7 percent of N-methyl-N-stearyl-methyl-stearyl ammonium dithiocarbamate and 0.3 percent of beeswax. The measurements of the thermostability carried out under a nitrogen atmosphere at 222° C. show that an unstabilized comparison specimen splits off 14 percent of formaldehyde after 20 minutes and 37 percent thereof after 120 minutes, whereas the stabilized polyoxymethylene diacetate only loses 2 percent of formaldehyde after 20 minutes and only 7.5 percent thereof after 120 minutes.

Example 8

The procedure is as indicated in Example 6. A polyoxymethylene diacetate is used which has an intrinsic viscosity of 0.72 (measured in butyrolactone at 150° C.). The additives admixed with the polyoxymethylene diacetate in acetone solution comprises 1.5 percent of N-methyl - N - stearyl-methylstearyl ammonium dithiocarbamate and 0.3 percent of beeswax. The thermostability measurements conducted under a nitrogen atmosphere at 222° C. show that an unstabilized comparison specimen splits off 10 percent of formaldehyde after 20 minutes and 21.5 percent thereof after 120 minutes, while the stabilized polyoxymethylene diacetate loses only 2.5 percent of formaldehyde after 20 minutes and only 9 percent after 120 minutes.

Example 9

The procedure is as indicated in Example 6 and a polyoxymethylene diacetate is used which has an intrinsic viscosity of 1.1 (measured at 0.5 percent solution in butyrolactone at 150° C.). The additives admixed with the polyoxymethylene diacetate in acetone solution comprises 2 percent of 2,3,5,6-tetraethyl-p-phenylene diamine and 0.5 percent of beeswax. The thermostability measurements carried out under a nitrogen atmosphere at 222° C. show an unstabilized comparison specimen splits off 6 percent of formaldehyde after 20 minutes and 13 percent thereof after 120 minutes, while the stabilized polyoxymethylene diacetate loses only 2 percent of formaldehyde after 20 minutes and only 5 percent after 120 minutes.

Example 10

The procedure is as indicated in Example 6 and a polyoxymethylene diacetate is used which has an intrinsic viscosity of 1.0 (measured at 0.5 percent solution in butyrolactone at 150° C.). The additives admixed with the polyoxymethylene diacetate in acetone solution comprise 2.5 percent of diethyl stearylamine and 0.4 percent of beeswax. The thermostability measurements carried out under a nitrogen atmosphere at 222° C. show an unstabilized comparison specimen already splits off 10 percent of formaldehyde after 20 minutes and 25 percent thereof after 120 minutes, while the stabilized polyoxymethylene diacetate loses only 3 percent of formaldehyde after 20 minutes and only 8 percent thereof after 120 minutes.

Example 11

The procedure is as indicated in Example 6 and a polyoxymethylene diacetate is used which has an intrinsic viscosity of 1.4 (measured in butyrolactone at 150° C.). The additives admixed with the polyoxymethylene diacetate in acetone solution comprise 2 percent of 4-diethylaminobenzaldehyde phenol hydrazone and 0.4 percent of beeswax. The thermostability measurements carried out in a nitrogen atmosphere at 222° C. show that an unstabilized comparison specimen already splits off 5 percent of formaldehyde after 20 minutes and 24.5 percent thereof after 120 minutes, whereas the stabilized polyoxymethylene diacetate only loses 2 percent of formaldehyde after 20 minutes and only 6 percent thereof after 120 minutes.

As to the compounds of group 3 of the present specification these may correspond to the general formula:

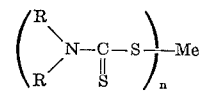

wherein the radicals denoted R are like or different monovalent aliphatic radicals (having 1 to 20 carbon atoms), cycloaliphatic radicals (such as cyclohexyl), araliphatic radicals (such as benzyl), and both radicals may form members of a heterocylic ring (such as of piperidine or morpholine), Me stands for a metal or an amine as indicated above and n for a whole number corresponding with the valency of Me. As salt forming bases there are preferred secondary amines which are substituted by aliphatic, araliphatic or cycloaliphatic radicals having preferably a total of 8 to 40 carbon atoms.

What we claim is:

1. A composition comprising a thermally stabilized, normally solid, synthetic high molecular weight polyoxymethylene selected from the group consisting of acylated and alkylated polyoxymethylenes and a stabilizing amount of a reaction product of hexamethylene diisocyanate and a member selected from the group consisting of glycols and mercaptans.

References Cited

UNITED STATES PATENTS

| 3,144,431 | 8/1964 | Dolce | 260—45.85 |
| 3,166,530 | 1/1965 | Eguchi | 260—858 |
| 3,204,012 | 8/1965 | Eguchi | 260—858 |
| 3,346,540 | 10/1967 | Eguchi | 260—67 |

FOREIGN PATENTS 683,009    3/1964   Canada.

SAMUEL H. BLECH, *Primary Examiner.*

P. LIEBERMAN, *Assistant Examiner.*

U.S. Cl. X.R.

260—28, 45.8, 45.9, 45.75, 45.85, 67, 77.5, 79